United States Patent [19]

Hieda

[11] Patent Number: 4,748,506
[45] Date of Patent: May 31, 1988

[54] IMAGE PICKUP APPARATUS WITH EXCESS-CHARGE CONTROL

[75] Inventor: Teruo Hieda, Yokohama, Japan

[73] Assignee: Canon Kabushiki Kaisha, Tokyo, Japan

[21] Appl. No.: 809,915

[22] Filed: Dec. 17, 1985

[30] Foreign Application Priority Data

Dec. 28, 1984 [JP] Japan ............................... 59-276972
Dec. 28, 1984 [JP] Japan ............................... 59-276973
Dec. 28, 1984 [JP] Japan ............................... 59-276974

[51] Int. Cl.⁴ .............................................. H04N 3/14
[52] U.S. Cl. ..................... 358/213.18; 358/213.19; 358/213.15
[58] Field of Search ............... 358/909, 212, 213, 228, 358/213.18, 213.15, 213.26, 213.19

[56] References Cited

U.S. PATENT DOCUMENTS

| | | | |
|---|---|---|---|
| 3,435,136 | 3/1969 | Bachmann et al. | 358/224 |
| 4,327,378 | 4/1982 | Tanaka et al. | 358/213 |
| 4,409,472 | 10/1983 | Kimura | 358/228 |
| 4,435,729 | 3/1984 | Harwood et al. | 358/183 |
| 4,516,172 | 5/1985 | Miyata et al. | 358/213 |
| 4,599,654 | 7/1986 | Monroe | 358/213 |
| 4,599,657 | 7/1986 | Kinoshita et al. | 358/213 |
| 4,651,215 | 3/1987 | Bell et al. | 358/213.26 |
| 4,689,686 | 8/1987 | Hasimoto et al. | 358/213.26 |

Primary Examiner—Jin F. Ng
Assistant Examiner—Stephen Brinich
Attorney, Agent, or Firm—Fitzpatrick, Cella, Harper & Scinto

[57] ABSTRACT

An image pickup apparatus in which a flux of light which enters through an iris to form an optical image is received by an image pickup element, the accumulating time of this image pickup element is changed, thereby converting the optical image which is obtained for a desired period of time into an electrical signal. In this apparatus, for example, the gain of the iris or signal processing system of the electrical signal is changed to control the electrical signal to a predetermined level irrespective of the noise component which is generated when the accumulating time is changed, to eliminate adverse effects of undrained excess charge in the pickup unit.

40 Claims, 7 Drawing Sheets

IMAGE PICKUP APPARATUS WITH EXCESS-CHARGE CONTROL

BACKGROUND OF THE INVENTION

1. Field of the Invention

The present invention relates to an image pickup apparatus using a solid state image pickup device.

2. Description of the Prior Art

In the case of using a solid state image pickup device, for example, a CCD (charge coupled device), in e.g., a television camera, it has conventionally been proposed that the accumulating time of the image pickup device can be reduced to less than the field (or frame) period of a television signal by changing the method of driving the solid state image pickup device.

For instance, in the U.S. patent application Ser. No. 596,404 filed on Apr. 3, 1984, there has been proposed by the assignee of this application the driving method whereby, for example, in solid state image pickup devices of the frame transfer type, the charges in the photosensing unit to perform the photoelectric conversion and the accumulation of the charges are drained by once vertically transferring them within the vertical interval and the remaining interval of the vertical interval is further used as the substantial accumulating time.

According to this method, in the television camera of, e.g., the NTSC system, although the accumulating time is ordinarily 1/60 second, this time can be set to 1/120 second, 1/500 second, or the like; therefore, there are effects such that the iris need not be reduced even in the case of a large amount of incident light, an image of an object moving at a high speed is not moved and the like. However, while the foregoing operation is being performed, in particular, if the substantial accumulating time is reduced when the charges which are accumulated for the period of time within the vertical interval are drained without taking them out as a signal as mentioned above, the amount of charges to be drained will have considerably increased. For example, when the substantial accumulating time ($t_1$) is set to 1/500 second, the ratio of the accumulating time $t_2$ of the charges to be drained to the time $t_1$ becomes $$t_2/t_1 = (1/60 - 1/500)/1/500 \approx 7.3$$

Namely, the ratio becomes about 7.3. Assuming that the level of charges which are accumulated for the period of time $t_1$ is the normal level, charges which are 7.3 times larger than normal level are accumulated for the time $t_2$. In the case where such a large number of charges are accumulated in this manner, it is very difficult to drain all of these charges and prevent their having an influence on the substantial accumulating time. Particularly, a great quantity of charges are generated in what is called a highlight portion or the like on the display screen and when the vertical transfer is performed within the vertical interval to drain the charges, a large amount of charges remain, so that an image which is displayed on the screen is adversely influenced.

In the output of the image pickup device, the amount of those residual charges becomes four to ten times (nearly the level of the saturation signal of the image pickup device) as large as the signal level. Thus, such a high signal level causes abnormal response of the signal processor and malfunction of the gain control or iris control.

In addition, an image pickup apparatus in which the charges in both the photosensing unit and the storage unit are drained within the vertical interval has also been proposed. According to this apparatus, no output signal is obtained for the interval before the transfer within the vertical interval, so that the iris control, gain control and the like become inaccurate.

SUMMARY OF THE INVENTION

It is an object of the present invention to solve the above-mentioned conventional drawbacks.

A second object of the invention is to provide an image pickup apparatus in which the iris control and gain control operations are properly performed even in the case where the substantial accumulating time is reduced due to the draining of a signal from an attached photoelectric converting device within the photoelectric converting and charge accumulating intervals.

Another object of the invention is to provide an image pickup apparatus which performs the iris control and gain control operations in response to an output of a photoelectric converting device, wherein even in the case where an unnecessary noise component is time-sequentially generated in the output of the photoelectric converting device, the image pickup apparatus is not influenced by this noise component.

Still another object of the invention is to provide an image pickup apparatus in which the iris control and gain control operations of the image pickup apparatus, in particular, are properly carried out irrespective of the noise component mentioned above.

According to the present invention, these objects are attained by provision of an image pickup apparatus having an image pickup device which converts an image into an electrical signal and also outputs an Robstacle" or unusable signal, i.e., a signal whose presence it is desired to eliminate. A control device is provided in conjunction with the image pickup device, to control the apparatus responsive to the electrical signal, in such a manner that the pickup apparatus generates a proper signal representing the image. A device is also provided for adjusting the control such that the latter is not influenced by the obstacle signal output by the image pickup device. The control device may for example include an iris for limiting the amount of image which enters the pickup device. The control may for example include an amplifier for amplifying the electrical signal outputted from the image pickup device and a control circuit for controlling the amplifier gain. According to one preferred embodiment, the pickup device may include an image sensing portion for producing the electrical image signal and the readout portion for reading out that signal, and a drive means may be provided for driving the pickup device. In this embodiment, the drive means has a first mode for reading the image signal out from the pickup device and a second mode for clearing the signal from the sensing portion of the pickup device during readout of the signal. First and second control means are also provided in this embodiment, the first being responsive to the image signal and being structured and arranged for effecting control of a signal level of the image signal, and the second being responsive to a noise component due to the pickup means when the latter is driven in the second mode and being structured and arranged to respond to the noise component to effect control of the first control means.

The above and other objects and features of the present invention will be more fully appreciated from the following detailed description with reference to the accompanying drawings.

DESCRIPTION OF THE PREFERRED EMBODIMENTS

The preferred embodiments of the present invention will now be described in detail hereinbelow with reference to the drawings.

Figure 1:
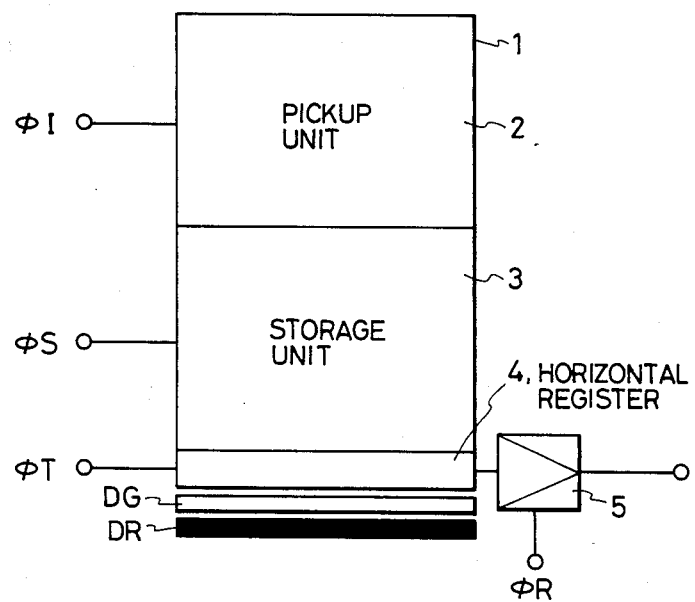
FIG. 1 is an explanatory diagram of a frame transfer type CCD.

FIG. 1 is an arrangement diagram of a CCD solid state image pickup device of the frame transfer type which can be applied to the present invention. In the diagram, reference numeral 1 denotes a frame transfer type CCD solid state image pickup device; 2 is a pickup unit serving as a photosensing part for photoelectrically converting an incident light from an image pickup optical system (not shown) and accumulating charges; 3 a storage unit for transferring the charges in the pickup unit 2 and further reading them out at every horizontal interval; 4 a horizontal register for horizontally transferring, in response to a pulse $\phi T$, the charges which are transferred from the storage unit 3 at every horizontal interval; 5 a charge-voltage converting unit for converting the charges from the horizontal register 4 into a voltage and outputting this voltage; DG a gate or barrier provided along the register 4; and DR an overflow drain.

Figure 2A:
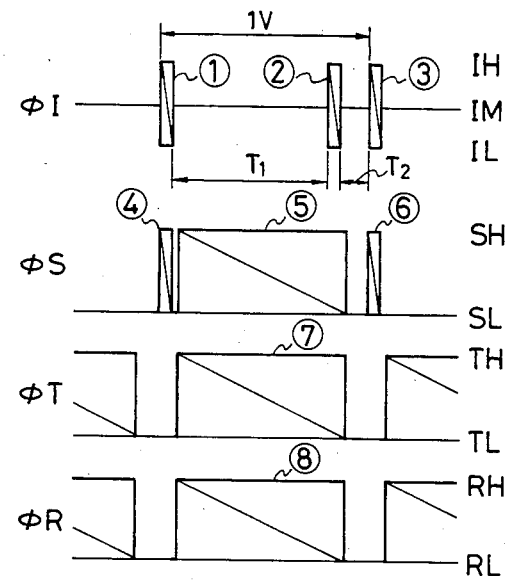
FIG. 2A is an explanatory diagram of the short time mode.

FIG. 2A is a drive waveform diagram in a short time mode of the image pickup device 1. In this diagram, $\phi I$, $\phi S$, $\phi T$ and $\phi R$ indicate drive waveforms of the pickup unit 2, storage unit 3, register 4, and converting unit 5, respectively.

Reference numeral IV represents a vertical interval of a television signal and $T_2$ is a substantial accumulating time.

At the start of the vertical interval, the charges in the pickup unit 2 are vertically transferred to the storage unit 3 in response to vertical transfer pulses indicated at ① and ④. Thereafter, those charges are transferred to the horizontal register 4 on a line by line basis for one horizontal interval by a pulse shown at ⑤ and then horizontally transferred to the converting unit 5 for the horizontal interval by a pulse ⑦. Those charges are converted to a voltage by a pulse ⑧ and taken out as an output.

Figure 2B:
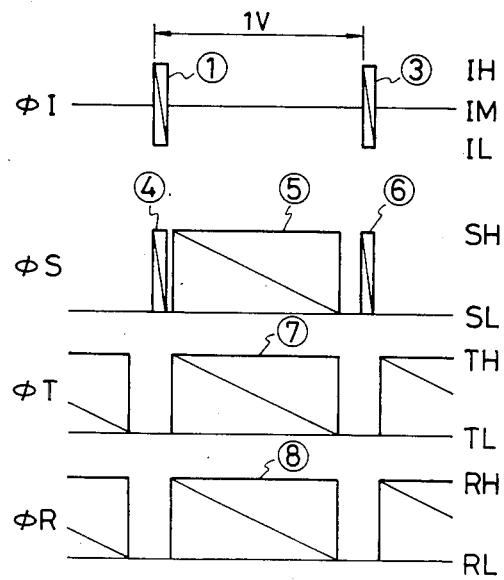
FIG. 2B is an explanatory diagram of the normal mode.

After the charges have been photoelectrically converted and accumulated for a period of time $T_1$ in the pickup unit 2, the charges only in the pickup unit are vertically transferred by a pulse ② and the charges accumulated for the period $T_1$ are drained from the pickup unit. Thereafter, the charges picked up and accumulated for the period $T_2$ are vertically transferred to the storage unit 3 by pulses ③ and ⑥. The subsequent operation is executed in a manner similar to the above. As shown in FIG. 2B, the pulse ② in FIG. 2 is omitted in the normal mode in that about one field period is ordinarily the accumulating time. In the short time mode, the charges only in the pickup unit 2 are vertically transferred by the pulse ② and when the charges accumulated in the period $T_1$ are drained, the amount of charges which are accumulated for the period $T_1$ is larger than that for the period $T_2$, so that all of them are not always drained but some are left.

Figure 3:
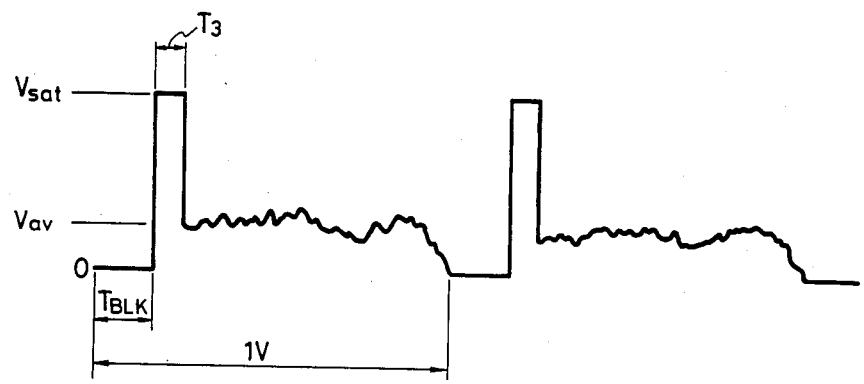
FIG. 3 is an explanatory diagram of an unnecessary signal which is generated in the short time mode.

FIG. 3 shows an output waveform of the image derived as described above.

In FIG. 3, $V_{sat}$ denotes a saturation output voltage of the image pickup device, $V_{av}$ is a normal average output voltage of the image pickup device, and $T_{BLK}$ is a vertical blanking interval. As mentioned above, the residual charges which could not be drained by the vertical transfer before the substantial accumulating time $T_2$ are outputted, so that an output of the $V_{sat}$ level is generated in an initial period $T_3$ of the vertical interval. When the period $T_3$ is short, this output does not appear on the display screen; however, $V_{sat}$ is as much as about three to five times larger than $V_{av}$, so that the signal process, iris control, gain control, and the like are largely adversely influenced.

Practically speaking, in general, the iris control, gain control, or the like is carried out in a manner such that an image output, shown in FIG. 3, is transmitted through a low-pass filter and its mean value is obtained. When this mean value is small, the iris is largely opened, in execution of the iris control or the gain is increased in execution of the gain control, or the like. Therefore, in the case of performing iris control or gain control, the mean value becomes higher then the inherent level due to the $V_{sat}$ as shown in FIG. 3. Thus, hitherto, there has been a problem that the iris is likely to be closed or the gain to be controlled decreases due to such a variation of the mean value.

Figure 4:
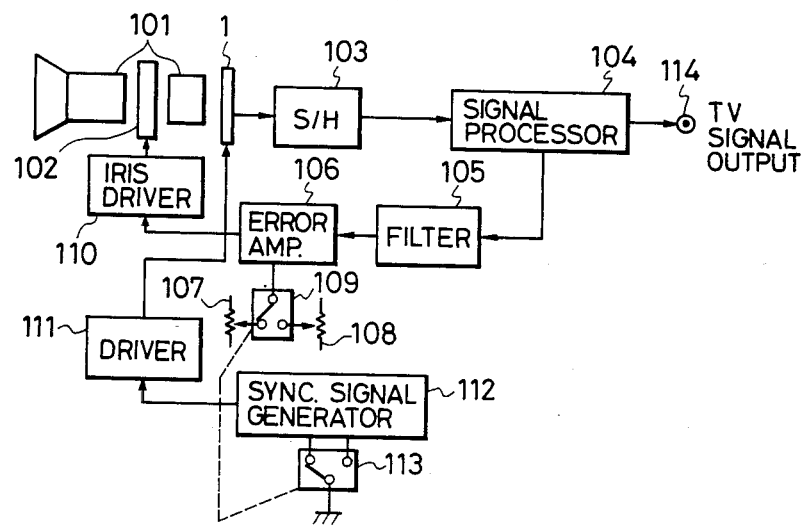
FIG. 4 is a block diagram showing an arrangement of a first embodiment of an image pickup apparatus of the present invention.

FIG. 4 shows the first preferred embodiment of the present invention to solve such a problem. Reference numeral 101 denotes an image pickup optical system including an image pickup lens, an optical filter, and the like; 102 an iris; 103 a sample/hold circuit ("S/H") for sequencing a dispersive output from the image pickup device 1; 104 a signal processor for processing an output signal of the sample/hold circuit 103 and synthesizing a television signal; 105 a filter circuit for filtering a luminance signal which is outputted from the processor 104; 106 an error or differential amplifier for comparing an output of the filter circuit 105 with a reference level;

107 and 108 voltage dividers for generating reference levels; 109 a switch serving as correcting means for switching between the reference levels formed by the dividers 107 and 108; 110 an iris driver serving as control means for controlling an amount of photo charges produced in the image pickup device 1 by driving the iris; 111 a driver for driving the device 1; 112 a sync signal generator serving as accumulating time control means for generating a drive pulse of the device 1, a drive pulse of the sample/hold circuit 103, a sync pulse for signal processing, a television sync signal, and the like as shown in FIGS. 2A and 2B; and 113 a switch for switching the output modes of the generator 112 and thereby switching the operating mode of the device 1. The switches 109 and 113 operate in an interlocking manner. The operating modes of the image pickup device 1 include the normal mode, similar to that of ordinary video cameras, in which the accumulating time is used as a vertical interval of a television signal, and the short time mode, in which the charges only in the pickup unit are vertically transferred within the vertical interval. Those operating modes are switched by changing over the outputs of the sync signal generator 112 by the switch 113.

An object image is transmitted through the image pickup optical system 101 and iris 102 and photoelectrically converted to an electrical signal by the device 1. This electrical signal is outputted synchronously with the sync signal and sequenced by the sample/hold circuit 103 and processed by the signal processor 104. At the same time, a television signal is synthesized together with the sync signal from the generator 112 and outputted to a television signal output terminal 114. On the other hand, a luminance signal for the iris control is outputted from the signal processor 104, filtered by the filter 105 and compared with the reference level by the error or differential amplifier 106. Then, the luminance signal is inputted to the iris driver 110, thereby controlling the iris 102.

Due to this control, the feedback control is performed in a manner such that a mean value of the output voltage of the filter 105, namely, the output voltage of the device 1, becomes a constant voltage which is set by the voltage driver 107 or 108.

In this embodiment, two kinds of reference voltages are provided for the error or differential amplifier 106 and switched by the switch 109, which operates interlockingly with the switch 113 as mentioned above. Namely, the reference voltages are set in accordance with the normal and short time modes as the operating modes of the image pickup device. Image pickup means is constituted by the components 1, 101 to 108, 110 to 114, and the like.

In the case of performing the operation in the short time mode in accordance with the timing as shown in FIG. 2A, the output of the voltage divider 108 in the short time mode is set to a voltage higher than that of the output of the voltage divider 107 in the normal mode by only about an amount of product of the time period $T_3$ and $V_{sat}$ in FIG. 3. Due to this, it was confirmed that in the television signal which is obtained as the output of the image pickup device 1, the luminance of the object image on the display screen can be kept constant irrespective of the operating mode of the device 1.

Although the reference levels can be switched by the switch 109 in this embodiment, the substantial accumulating time may be varied sequentially or in a stepwise manner and further the reference voltage may be changed sequentially or in a stepwise manner in response to the variation of the accumulating time. The invention also incorporates the above-mentioned constitution. On one hand, the invention can be also applied even to the constitution such that the level of the video signal of the image pickup means is controlled by a shutter in place of the iris.

In this case, the shutter may include not only mechanical or physical shutters but also electronic shutters, namely, means for controlling the accumulating time.

The invention can be also useful for the constitution such that the amount of photocharges which are produced is controlled using a combination of two or three of the iris, shutter, and means for controlling the accumulating time in accordance with the video signal level and thereby controlling the video signal level.

The apparatus may be also constituted in a manner such as to prevent the output of the image pickup device in the period $T_3$ in FIG. 3 from being inputted to the input side of the signal processor 104 by way of the method whereby the operation of the sample/hold circuit 103 is stopped for the period $T_3$ in FIG. 3, or a gate circuit is interposed in the signal system and the operation of the S/H circuit 103 is interrupted for the period $T_3$, or the like. Even in this case as well, the invention can be embodied in a manner similar to the above. However, in this case, since the video signal becomes a black level for the period $T_3$, the reference level is needed to be reduced in the short time mode.

Although the charges only in the pickup unit are vertically transferred within the vertical interval in the short time mode of the image pickup device in the above embodiment, the invention can be also applied to the system in which the charges in both of the pickup unit and the storage unit are drained within the vertical interval. In this case, the reference voltage in the short time mode is set to be lower than that in the normal mode.

Figure 5:
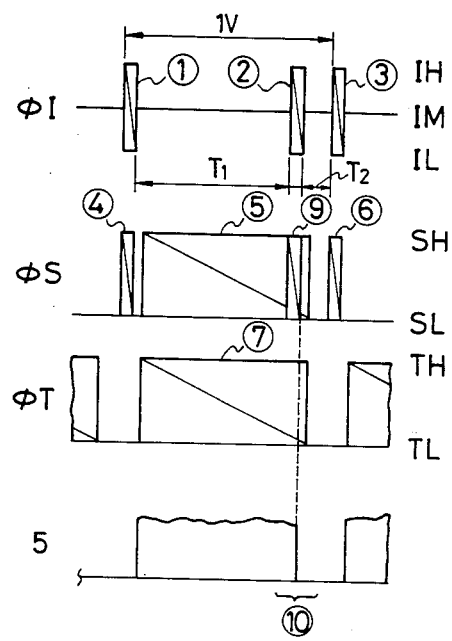
FIG. 5 is a timing chart of a second embodiment of the invention.

FIG. 5 is a diagram showing the second embodiment of the invention in the case as mentioned above, namely, showing a modification in the short time mode. In this embodiment, the charges in the storage unit are also vertically transferred at a high speed as indicated at ⑨ synchronously with the high-speed vertical transfer of the charges in the pickup unit as indicated at ②. Therefore, the charges in the pickup and storage units are collected to the horizontal shift register 4 and overflow. These overflow charges flow into the drain DR through the gate or barrier DG and are drained.

Thus, the output of the charge-voltage converting unit 5 lacks when the overflow of charges occurs in the shift register ④ as shown by the portion ⑩ in FIG. 5. In this case, as mentioned above, the reference voltage in the short time mode is corrected so as to become a value lower than that in the normal mode by correcting means by way of a switch or the like.

In addition, among image pickup devices of other systems, for example, CCD or MOS image pickup devices of the interline system, or the like, various kinds of devices capable of controlling the accumulating time have been also considered. The invention can be also applied to the case where the output characteristics of the image pickup devices in the short time mode and normal mode differ.

Although the foregoing embodiments have been described with respect to the case where the invention was applied to the iris control system, the invention can be also applied to the gain control system which operates such as to make the output level constant by changing the gain in accordance with the voltage of the video signal.

That is, the invention also includes the constitution in which the video signal level is controlled by the output system of the image pickup device.

Figure 6:
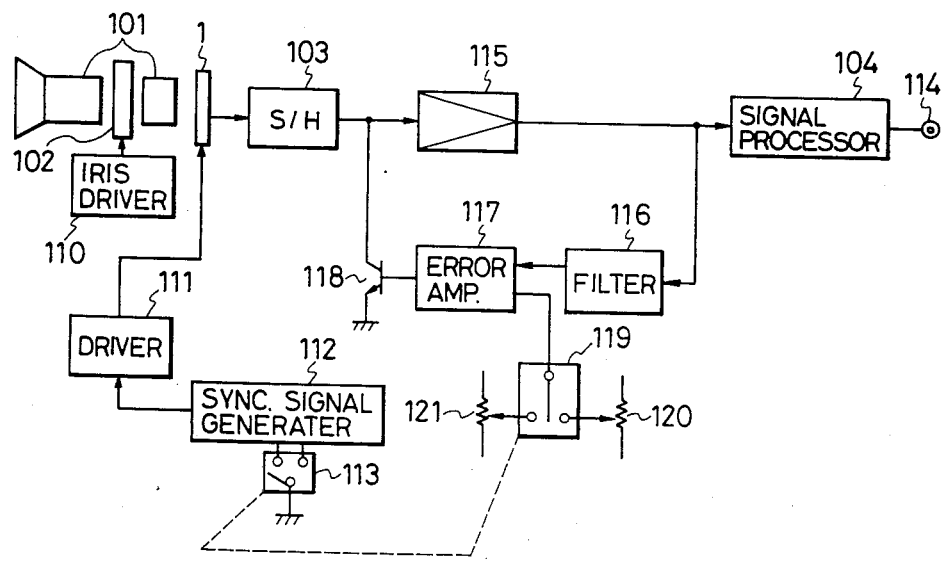
FIG. 6 is a block diagram showing an arrangement of a third embodiment of the invention.

FIG. 6 is a diagram showing the third embodiment of the invention in the above-mentioned case, in which the same parts and components as those shown in FIG. 4 are designated by the same reference numerals.

Reference numeral 115 denotes an amplifier; 116 a filter circuit for filtering an output of the amplifier 115; 117 an error or differential amplifier for comparing an output of the filter 116 with a reference level and thereby forming an error or difference signal; and 118 a transistor an impedance of which varies in repsonse to an output of the amplifier 117. The video input level to the amplifier 115 is changed by the transistor 118, thereby controlling the gain.

Voltage dividers 120 and 121 generate reference voltages, respectively, and either one of them is inputted as a reference level to the error or differential amplifier 117. The output level of the divider 120 is higher than the output level of the divider 121.

A switch 119 serves as correcting means for switching those reference levels and is switched interlockingly with the change-over of the switch 113 to switch the operating modes of the image pickup device.

Namely, the switch 119 is switched such as to input the output of the voltage divider 120 to the error amplifier 117 when the switch 113 is switched to the side of the short time mode and to input the output of the voltage divider 121 to the error amplifier 117 when the switch 113 is switched to the side of the normal mode.

As another example of the constitution in which the video signal level of the image pickup means is controlled due to the gain control as mentioned above, it is also possible to control the video signal level of the image pickup means by controlling the sensitivity of the image pickup device itself.

According to those methods by the gain control, there is an effect such that the response speed is very high as compared with the method whereby the video signal level is changed using the iris, shutter, or the like.

The occurrence of the malfunction in the control of the iris and gain control systems due to the signal which is generated for the period $T_3$ in FIG. 3 can be solved by the foregoing embodiments. However, there is a problem such that when the signal shown in FIG. 3 is reproduced by the monitor display, the signal which is generated for the period $T_3$ in FIG. 3 appears in a part of the screen and an indistinct image is displayed as mentioned above. An embodiment to solve such a problem will then be described with reference to FIGS. 7 to 12.

Figure 7:
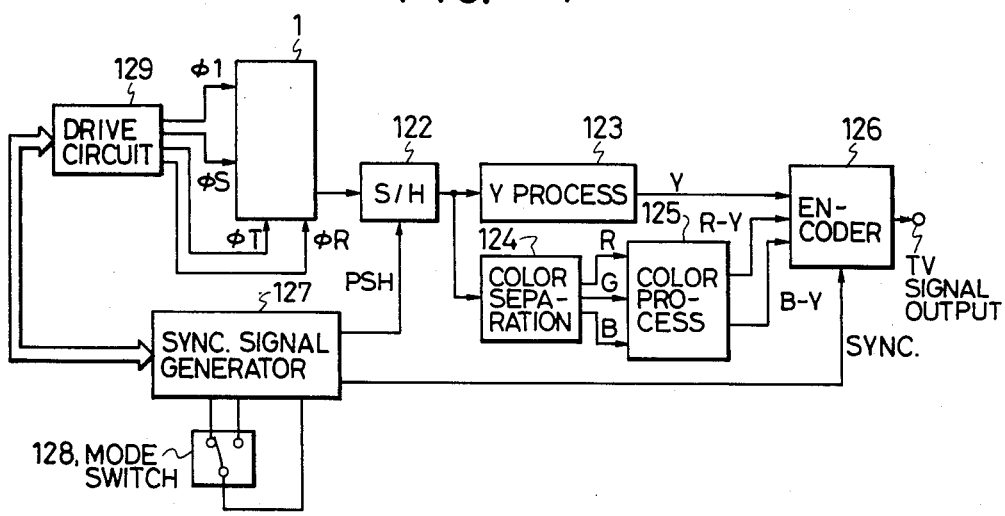
FIG. 7 is a block diagram showing an arrangement of the third embodiment of an image pickup apparatus of the invention.

FIG. 7 shows an embodiment to solve the above-mentioned problem of the invention. In FIG. 7, reference numeral 122 denotes a sample/hold circuit serving as mask means for eliminating a clock signal from the output of the image pickup device 1 and also setting the signal for a partial period of the video signal to the signal of a predetermined level; 123 is a luminance signal Y processor including a low-pass filter, clamping circuit, a gamma circuit, and a clipping circuit; 124 a color separating circuit for separating chrominance signals of red R, blue B, and green G from an output of the sample/hold circuit 122; 125 a color processor including low-pass filters, clamping circuits, gamma circuits, clipping circuits, and matrix circuits of those R, G and B signals; 126 an encoder for synthesizing a television signal by the Y, R-Y, and B-Y signals and a sync signal; 127 a sync signal generator including a reference oscillation frequency divider and a decoder; 128 a mode switch for switching the operating modes of the generator 127; and 129 a drive circuit for producing a drive pulse of the image pickup device by an output of the generator 127.

The output of the image pickup device 1 is sequenced after removing the clock signal therefrom by the sample/hold circuit 122. The luminance signal Y is formed by the Y processor 123 and inputted to the encoder 126. The output of the S/H circuit 122 is also inputted to the color separating circuit 124, by which the color components in the video signal are separated in accordance with a pattern of a color separating filter (not shown) sticked on the image pickup device 1, thereby forming the R, B and G signals. These R, G and B signals are respectively processed by the color processor 125 and further subjected to the matrix operation to form the color difference signals R-Y and B-Y. The encoder 126 receives the Y signal from the Y processor 123, the R-Y and B-Y signals from the color processor 125, and the sync signal from the generator 127 and forms a television signal of, for example, the NTSC system or the like and outputs this TV signal. The mode switch 128 switches the operating modes of the image pickup device 1 to either of the normal mode and the short time mode.

The operation of the drive circuit 129 shown in FIG. 7 will then be described with reference to timing charts shown in FIGS. 8A to 8D.

Figure 8A:
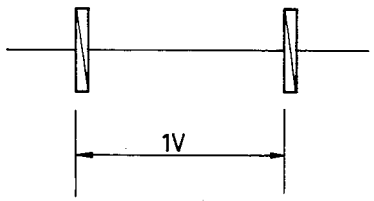
FIGS. 8A to 8D are timing charts of the third embodiment of the invention.
Figure 8B:
Figure 8C:
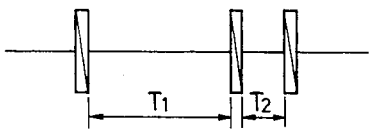
Figure 8D:
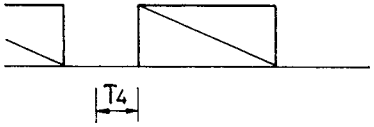

FIG. 8A shows a pulse $\phi I$ in the normal mode and the vertical transfer is performed within the vertical blanking interval in response to this pulse $\phi I$. FIG. 8B shows a pulse $P_{SH}$ in the normal mode which is continuously generated for the video interval. FIG. 8C shows a pulse $\phi I$ in the short time mode and a vertical transfer pulse is generated within the video interval, thereby reducing the substantial accumulating time. FIG. 8D shows a pulse $P_{SH}$ in the short time mode and the pulse $P_{SH}$ is stopped for a period of time $T_4$ which is slightly (for example, one to a few horizontal interval) longer than the time corresponding to $T_3$ in FIG. 3 in the video period.

Figure 9:
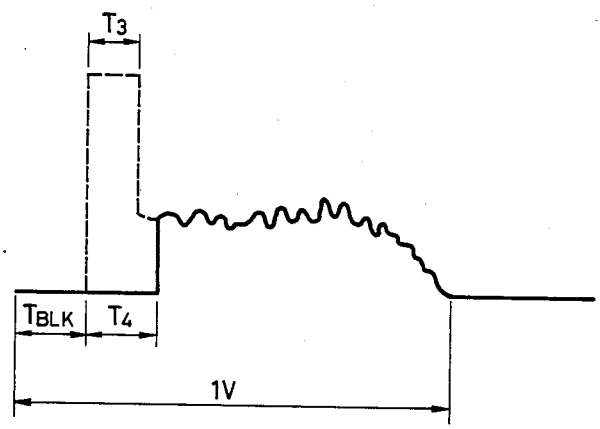
FIG. 9 is an output diagram of a sample/hold circuit of the third embodiment of the invention.

The output of the sample/hold circuit 122 in the short time mode is shown in FIG. 9. It will be appreciated that there is an effect such that the signal due to the charges which cannot be drained for the period $T_3$ does not appear in the output of the S/H circuit 122, so that the following circuits are not adversely affected. Further, in this case, even when the video signal is displayed on the monitor screen as well, the display portion corresponding to the period $T_3$ is muted and becomes black; therefore, the foregoing problem such that an indistinct image is displayed on the monitor screen is solved.

Figure 10:
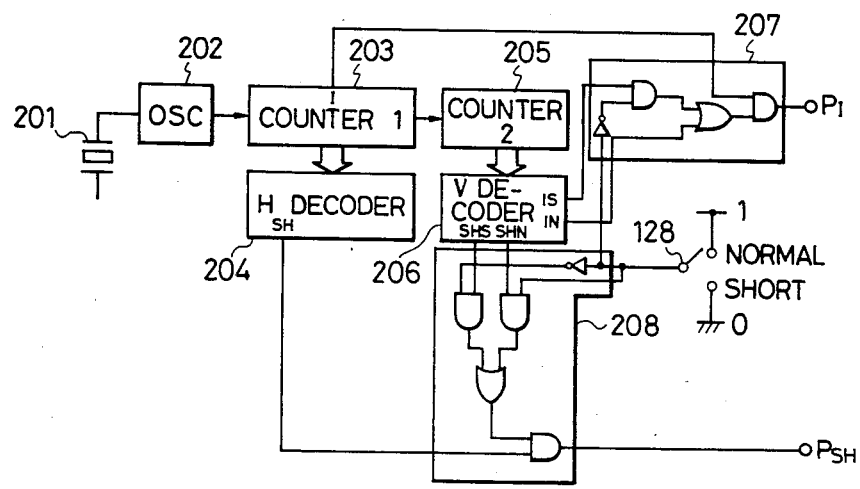
FIG. 10 is a diagram showing an example of an arrangement of a sync signal generator 127 shown in FIG. 7.

FIG. 10 is a block diagram showing an arrangement of the main part of the sync signal generator 127. In FIG. 10, reference numeral 201 denotes a quartz resonator; 202 a reference oscillator; 203 a counter-1; 204 a decoder of a pulse of the H system; 205 a counter-2; 206 a decoder of a pulse of the V system; 207 a $P_I$ switching circuit; and 208 a $P_{SH}$ switching circuit. When an output of the mode switch 128 is "1", the pulses $P_I$ and $P_{SH}$ as shown in FIGS. 8A and 8B are formed from pulses $I_N$ and $SH_N$ in the normal mode. When the output of the mode switch 128 is "0", the pulses $P_I$ and $P_{SH}$ as shown in FIGS. 8C and 8D are formed from pulses $I_S$ and $SH_S$ in the short time mode.

Figure 11:
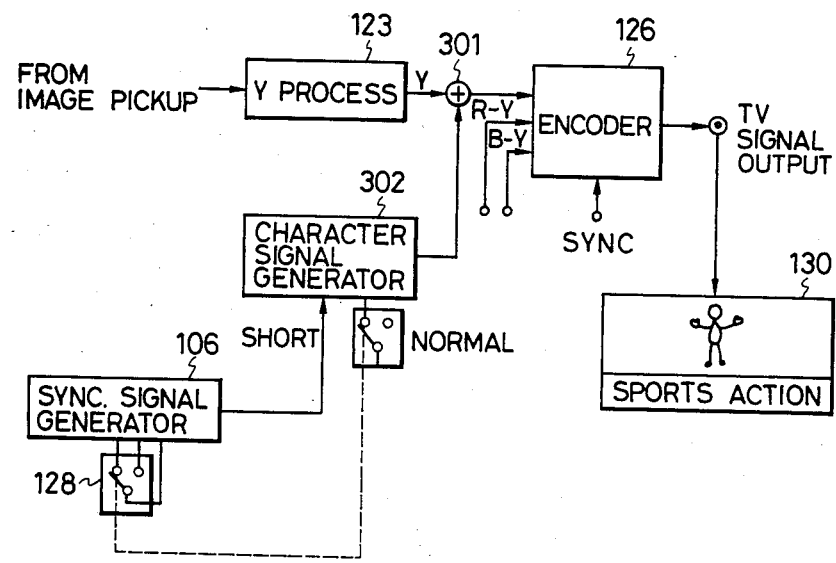
FIG. 11 is a block diagram of an embodiment in which a signal which is generated for the interval shown at $T_3$ in FIG. 3 is replaced by another signal.

With reference to FIG. 11, explanation will then be made with regard to an embodiment in which the signal which is generated for the period $T_3$ in FIG. 3 is replaced by, for example, a character pattern signal to solve the problem such that the signal which is generated for the period $T_3$ in FIG. 3 appears on a part of the display screen and causes the display image to become indistinct.

FIG. 11 is a block diagram showing an embodiment in such a case.

In FIG. 11, reference numeral 301 denotes an adder and 302 is a character signal generator. When the mode switch 128 is switched to the side of the normal mode, a character signal generator 302 does not operate. On the contrary, when the switch 128 is switched to the side of the short time mode, the generator 302 operates and a character signal is generated and the character data is mixed to the luminance signal by the adder 301. The character signal is constituted such as to insert characters for the period $T_4$ in FIG. 9 in response to the sync pulse from the sync signal generator 106. The signal which is generated is not limited to the character signal but may be a symbol signal or the like.

In FIG. 11, reference numeral 130 denoted an example of display on the monitor when characters were inserted in such a case. According to this embodiment, when the substantial accumulating time is shorter than the ordinaray time, the situation in which the photographing operation suitable for "SPORTS ACTION" using a short accumulating time is being executed can be displayed on the monitor and informed to the operator who is watching the monitor 130.

According to this embodiment, even when the substantial accumulating time of the image pickup device is set to be short, it is possible to eliminate an adverse influence to the display screen due to the unnecessary charges when the video signal is displayed on the monitor.

Although the above embodiment relates to the system in which the charges only in the pickup unit are vertically transferred within the vertical interval in the short time mode of the image pickup device, even in the system in which the charges in both the pickup and storage units are drained within the vertical interval as well, a part of the readout image becomes indistinct; therefore, the invention can be applied to such a system.

Figure 12:
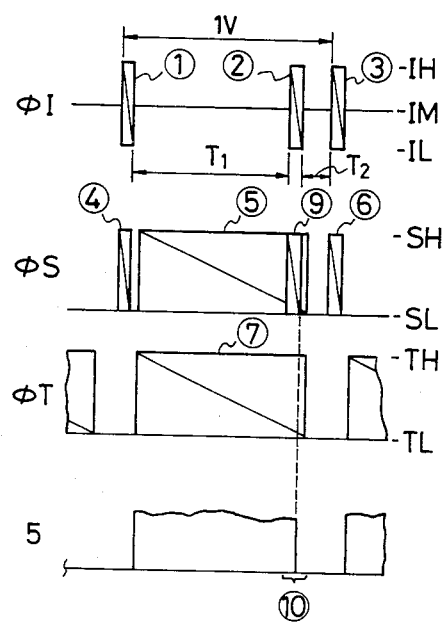
FIG. 12 is a timing chart of another embodiment of the short time mode shown in FIG. 2A.

FIG. 12 shows a timing chart of an embodiment in the case where the invention is applied to the system for performing the vertical transfer as mentioned above; namely, a modified form of the short time mode is shown. In this embodiment, the charges in the storage unit are also vertically transferred at a high speed in the portion ⑨ synchronously with the high-speed vertical transfer in the portion ② in the pickup unit. Therefore, the charges in the pickup and storage units are collected to the horizontal shift register 4 and overflow. These overflow charges flow into the drain DR through the gate or barrier DG and are drained.

Thus, the output of the charge-voltage converting unit 5 lacks in the portion ⑩ and an indistinct image is displayed on the screen.

To solve this drawback, the methods shown in the embodiments of FIGS. 7 to 12 can be applied.

On one hand, among image pickup devices of other systems, for example, CCD or MOS image pickup devices of the interline system, or the like, various kinds of devices capable of controlling the accumulating time have been considered. For instance, in the case of controlling the accumulating time using the interline system CCD, a noise component is added to the screen at near the end of the vertical interval. Therefore, it is sufficient to control the video signal level in this portion so as to become a predetermined level.

Although the substantial accumulating time $T_2$ is constant in the above embodiment, it may be variable continuously or in a multistepwise manner. In such a case, the amount of charges which cannot be drained depends on the period $T_2$. For instance, since the amount of charges which cannot be drained increases as the period $T_2$ becomes short, the apparatus may be constituted such as to change the period $T_4$ shown in FIGS. 8 and 9 in accordance with the duration of the period $T_2$.

In addition, although the constitution to stop the operation of the sample/hold circuit was used as the mask means in the foregoing embodiments, the apparatus may be constituted such that a gate circuit is provided in front of or after the sample/hold circuit and the gate is closed for the period $T_4$. The invention also includes the constitution in which the signal for a partial interval of the video signal is replaced by another signal pattern of a predetermined level by a switching circuit.

As described above, according to the embodiments, even when the substantial accumulating time of the image pickup device is set to be short, an influence to the display screen due to the unnecessary charges can be eliminated.

What is claimed is:
1. An image pickup apparatus comprising:
    (a) image pickup means for converting an image into an electrical signal and for outputting the electrical signal at every predetermined interval, said image pickup means having a first mode, in which at least a part of the electrical signal is cleared off within said predetermined interval, and a second mode, in which the electrical signal is not cleared;
    (b) control means for controlling said image pickup apparatus, in response to the electrical signal, such that said image pickup apparatus generates a proper signal representing the image; and
    (c) adjusting means for adjusting said control means such that said control means is not influenced by a noise signal generated by said clearing-off performed by said image pickup means.
2. An image pickup apparatus according to claim 1, wherein said control means includes:
    (a) an optical member for controlling an amount of image which enters said image pickup means; and
    (b) a control circuit for changing a control state of said optical member in accordance with a level of said electrical signal.
3. An image pickup apparatus according to claim 2, wherein said optical member is an iris for limiting the amount of image which enters said image pickup means.
4. An image pickup apparatus according to claim 1, wherein said control means includes:
    (a) an amplifier for amplifying said electrical signal which is outputted from said image pickup means; and
    (b) a control circuit for controlling a gain of said amplifier such that said image pickup apparatus generates the proper signal representing said image.

5. An image pickup apparatus according to claim 1, wherein said control means controls said image pickup apparatus in response to an average of said electrical signal put out from said image pickup means.

6. An image pickup apparatus according to claim 1, wherein said noise signal is a signal collected to a part of said image pickup means in the electrical signal obtained by converting said image and is outputted from said image pickup means before said proper signal representing said image is outputted.

7. An image pickup apparatus according to claim 2, wherein said control means controls said image pickup apparatus in response to an average of said electrical signal put out from said image pickup means.

8. An image pickup apparatus according to claim 4, wherein said control means controls said image pickup apparatus in response to an average of said electrical signal put out from said image pickup means.

9. An image pickup apparatus according to claim 1, further comprising means for changing the adjusting operation of said adjusting means in response to the noise signal.

10. An apparatus comprising:
(a) image pickup means for converting an image into an electrical signal and for outputting the electrical signal at every predetermined interval, said image pickup means having a first mode in which at least a part of the electrical signal is cleared off within said predetermined interval and a second mode in which the electrical signal is not cleared;
(b) control means for controlling said apparatus such that a level of the electrical signal put out from said image pickup means becomes a predetermined value, said control means having at least two control modes; and
(c) means for making said control modes of said control means differ in accordance with said first and second modes of said image pickup means.

11. An apparatus according to claim 10, wherein said control means includes:
(a) an optical member for controlling an amount of image which enters said image pickup means; and
(b) means for changing a control state of said optical member in accordance with the level of said electrical signal, said changing means having a mode in that the control state of said optical member is changed to at least two kinds of control states.

12. An apparatus according to claim 11, wherein said optical member is an iris for limiting the amount of image which enters said image pickup means.

13. An apparatus according to claim 10, wherein said control means includes:
(a) an amplifier for amplifying said electrical signal which is outputted from said image pickup means; and
(b) a control circuit for controlling a gain of said amplifier such that said apparatus generates a proper signal representing said image, said control circuit controlling the gain of said amplifier to at least two kinds of gains.

14. An apparatus according to claim 10, wherein said control means is means for controlling said apparatus in response to the signal which is outputted from said image pickup means.

15. An apparatus according to claim 14, wherein said control means is means for controlling said apparatus in accordance with an average of the signal which is outputted from said image pickup means.

16. An apparatus according to claim 15, wherein said control means is means for controlling said apparatus on the basis of the result of comparison between said average and a predetermined value, and said control means has at least two kinds of said predetermined values, thereby having two control modes.

17. An apparatus according to claim 11, wherein said control means is means for controlling said apparatus in response to the signal which is outputted from said image pickup means.

18. An apparatus according to claim 13, wherein said control means is means for controlling said apparatus in response to the signal which is outputted from said image pickup means.

19. An apparatus according to claim 10, wherein said unit is a part of said image pickup means.

20. An apparatus comprising:
(a) image pickup means for converting an image into an electrical signal and for outputting the electrical signal at every predetermined interval, said image pickup means having a first mode in which at least a part of the electrical signal is cleared off within said predetermined interval and a second mode in which the electrical signal is not cleared; and
(b) correcting means for correcting at least a part of the electrical signal which is outputted from said image pickup means in accordance with the mode of said image pickup means.

21. An apparatus according to claim 20, wherein, when the electrical signal cleared off in said first mode is outputted from said image pickup means, said correcting means sets a level of the electrical signal to substantially zero.

22. An apparatus according to claim 20, wherein the electrical signal to be cleared off is cleared off after being collected into a portion of said image pickup means.

23. An apparatus according to claim 20, wherein when said electrical signal cleared off to a unit in said first mode is outputted, said correcting means replaces said electrical signal by another signal.

24. An apparatus according to claim 23, wherein said another signal is a signal corresponding to a character pattern.

25. An image pickup apparatus comprising:
(a) image pickup means for converting an image into an electrical signal and for accumulating the electrical signal;
(b) means for shortening a substantial accumulating time of said image pickup means by supplying thereto an accumulating time control signal; and
(c) means for correcting a part of the electrical signal to a predetermined signal other than the electrical signal in response to shortening operation of said shortening means.

26. An image pickup apparatus according to claim 25, further comprising display means for visually displaying an image corresponding to the electrical signal converted by said image pickup means.

27. An image pickup apparatus according to claim 26, wherein said correcting means is means for correcting a part of said electrical signal to a signal indicative of a character pattern.

28. An image pickup system comprising:
(a) image pickup means for providing an image signal representing a received image, said pickup means having at least an image sensing portion for producing said image signal and a readout portion for reading out said image signal;

(b) drive means for driving said pickup means, said drive means having a first mode for reading out said image signal from the pickup means and second mode for clearing said image signal from the sensing portion of the pickup means during the readout of the image signal, wherein the pickup means provides a noise component when driven in said second mode of said drive means;

(c) first control means responsive to said image signal for effecting control of a signal level of the image signal; and (d) second control means responsive to said noise component for effecting control of said first control means.

29. An image pickup system according to claim 28, wherein said pickup means is a solid state image sensing device.

30. An image pickup system according to claim 28, further comprising manually operable means for selecting between said first mode and said second mode.

31. An image pickup system according to claim 28, wherein said first control means includes:
(a) an optical member for controlling an amount of image which enters said image pickup means; and
(b) a control circuit for changing a control state of said optical means in accordance with a level of said image signal.

32. An image pickup system according to claim 31, wherein said optical member is an iris for limiting the amount of image which enters said image pickup means.

33. An image pickup system according to claim 28, wherein said first control means includes:
(a) an amplifier for amplifying the image signal which is outputted from said image pickup means; and
(b) a control circuit for controlling a gain of said amplifier such that said image pickup apparatus generates the proper signal representing the image.

34. An image pickup system according to claim 33, wherein said second control means changes controlling operation of said first control means in response to the noise component.

35. An image pickup apparatus comprising:
(a) image pickup means for providing an image signal representing a received image, said pickup means having at least an image sensing portion for producing the image signal and readout portion for reading out the image signal;
(b) drive means for driving said pickup means, said drive means having a first mode for reading out the image signal from the pickup means and a second mode for clearing said image signal from said sensing portion of said pickup means, wherein said pickup means provides a noise component when driven in said second mode of said drive means;
(c) means for visually displaying an image corresponding to the image signal read out by said read out portion of said image pickup means; and
(d) means for controlling said displaying means to display the operation of said drive means in said second mode.

36. An image pickup apparatus according to claim 35, wherein said pickup means is a solid state image sensing device.

37. An image pickup apparatus according to claim 35, further comprising manually operable means for selecting between said first mode and said second mode.

38. An image pickup apparatus according to claim 35, wherein said controlling means causes said displaying means to display a special pattern according to said second mode operation of said drive means.

39. An image pickup apparatus according to claim 38, wherein said control means includes:
(a) means for generating a pattern signal to display said special pattern on said monitor means; and
(b) means for mixing the image signal and the pattern signal, said mixing means supplying mixed signals to said displaying means.

40. An image pickup apparatus according to claim 39, wherein the pattern signal is a signal representative of a character.

* * * * *

UNITED STATES PATENT AND TRADEMARK OFFICE
CERTIFICATE OF CORRECTION

PATENT NO. : 4,748,506  
DATED : May 31, 1988  
INVENTOR(S) : TERUO HIEDA

Page 1 of 4

It is certified that error appears in the above-identified patent and that said Letters Patent is hereby corrected as shown below: Title page:

AT [56] IN THE REFERENCES CITED

U.S. Patents, "Hasimoto et al." should read --Hashimoto et al.--.

IN THE DRAWINGS

Sheet 4, Figure 6, "SYNC SIGNAL GENERATER" should read --SYNC SIGNAL GENERATOR--.

COLUMN 1

Line 51, "normal" should read --the normal--.

COLUMN 2

Line 37, "Rob-" should read --ob---.

COLUMN 4

Line 4, "and 4 ." should read --and ④ .--.
Line 49, "control" should read --control,--.
Line 49, "increased" should read --increased,--.
Line 52, "then" should read --than--.

UNITED STATES PATENT AND TRADEMARK OFFICE
CERTIFICATE OF CORRECTION

PATENT NO. : 4,748,506
DATED : May 31, 1988
INVENTOR(S) : TERUO HIEDA

It is certified that error appears in the above-identified patent and that said Letters Patent is hereby corrected as shown below:

COLUMN 5

Line 3, "swithcing" should read --switching--.
    Line 59, "of product" should read --equal to the product--.
    Line 60, "was" should read --has been--.

COLUMN 6

Line 4, "consti-" should read --construction.--.
    Line 5, "tution. On one hand, the" should read --The --.
    Line 6, "the constitution such that" should read
        --a construction wherein--.
    Line 12, "the constitution" should read --a construction--.
    Line 13, "such that" should read --wherein--.
    Line 14, "a combination of two or three" should be deleted.
    Line 15, "of the iris, shutter, and" should read
        --the iris and the shutter, or a combination of
        either or both with--.
    Line 18, "constituted" should read --constructed--.
    Line 21, "processor 104" should read --processor 104,--.
    Line 26, "Even in" should read --In--.
    Line 29, "needed" should be deleted.
    Line 48, "to" should read --in--.
    Line 52, "lacks" should read --is at or near a minimum
        level at the time--

UNITED STATES PATENT AND TRADEMARK OFFICE
CERTIFICATE OF CORRECTION

PATENT NO. : 4,748,506                                       Page 3 of 4

DATED     : May 31, 1988

INVENTOR(S) : TERUO HIEDA

It is certified that error appears in the above-identified patent and that said Letters Patent is hereby corrected as shown below:

COLUMN 7

Line 17, "an impedance" should read --the impedance--.
    Line 17, "repsonse" should read --response--.
    Line 30, "such as" should read --so as--.
    Line 36, "the constitution" should read --a construction--.
    Line 43, "such" should be deleted.
    Line 44, "whereby" should read --wherein--.
    Line 46, "the malfunction" should read --malfunctions--.
    Line 50, "such" should be deleted.
    Line 55, "then" should read --now--.

COLUMN 8

Line 8, "by" should read --responsive to--.
    Line 18, "sticked" should read --placed--.
    Line 29, "of" should be deleted.
    Line 29, "and" should read --or--.
    Line 32, "then" should be deleted.
    Line 34, "mode" should read --mode,--.
    Line 42, "mode" should read --mode,--.
    Line 43, "slightly" should read --slightly longer--.
    Line 44, "interval) longer" should read --intervals)--.
    Line 49, "such" should be deleted.

COLUMN 9

Line 27, "denoted" should read --denotes--.
    Line 31, "ordinaray" should read --ordinary--.
    Line 63, "lacks" should read --is lacking--.
    Line 67, "On one hand, among" should read --Among--.

UNITED STATES PATENT AND TRADEMARK OFFICE
CERTIFICATE OF CORRECTION

PATENT NO. : 4,748,506
DATED : May 31, 1988
INVENTOR(S) : TERUO HIEDA

It is certified that error appears in the above-identified patent and that said Letters Patent is hereby corrected as shown below:

COLUMN 10

Line 16, "constituted such" should read --constructed as--.
    Line 19, "constitution to stop" should read
             --construction in which--.
    Line 20, "was" should read --is stopped, is--.
    Line 22, "constituted" should read --constructed--.
    Line 25, "constitution" should read --construction--.
    Line 30, "influence to" should read --influence on--.

COLUMN 14

Line 16, "correp-" should read --corres---.
    Line 17, "sonding" should read --ponding--.

Signed and Sealed this

Twenty-fourth Day of January, 1989

Attest:

DONALD J. QUIGG

*Attesting Officer*     *Commissioner of Patents and Trademarks*